Jan. 25, 1955 W. MICK 2,700,189
PICKER BAR AND TOOTH ASSEMBLY
Filed Dec. 5, 1951
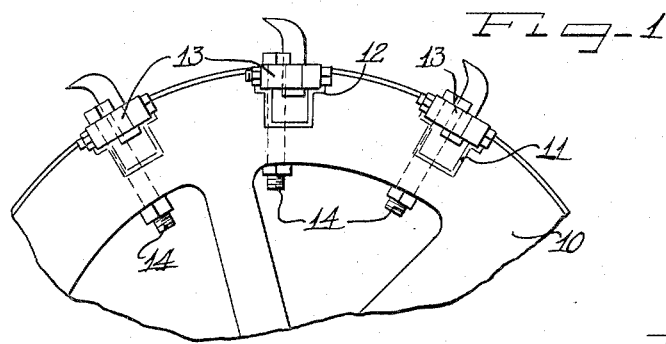
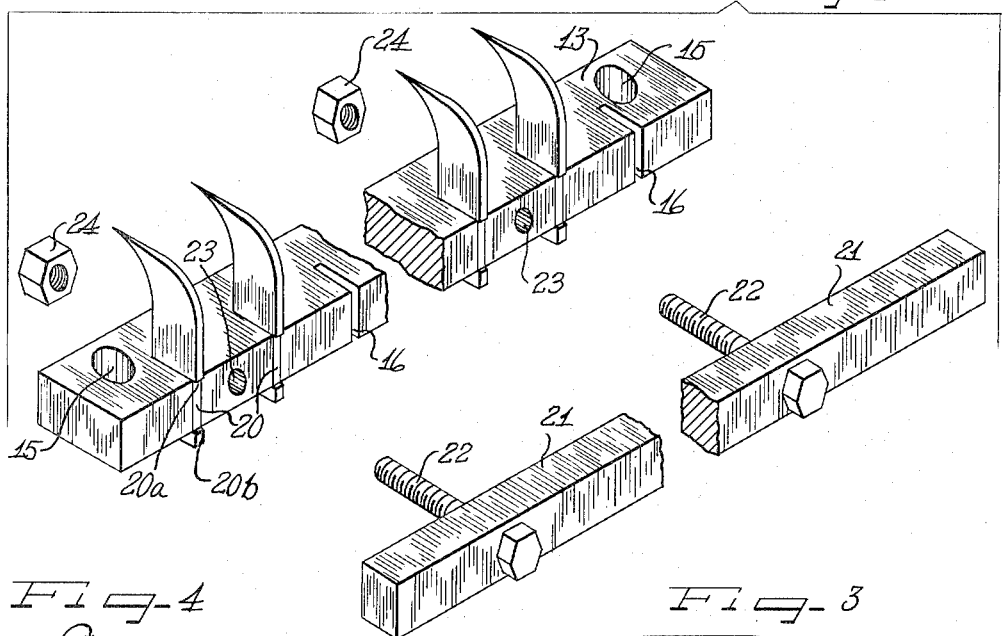
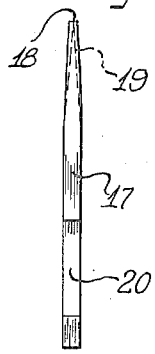
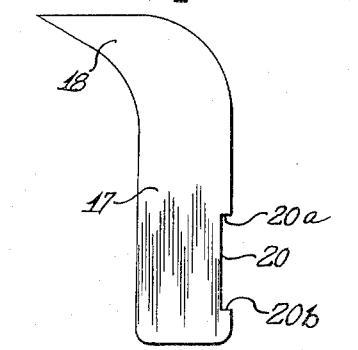
Inventor
William Mick

# United States Patent Office 2,700,189
Patented Jan. 25, 1955

2,700,189

PICKER BAR AND TOOTH ASSEMBLY

William Mick, Glen Ellyn, Ill.

Application December 5, 1951, Serial No. 259,950

4 Claims. (Cl. 19—97)

This invention relates to a picker bar and tooth assembly and is particularly concerned with improvements in the construction of textile machines known as pickers in which rags and similar material are picked apart, unravelled and so treated that the fibers thereof may be utilized in the production of new threads or yarn and fabrics.

Such pickers ordinarily comprise a cylindrical member having a plurality of forged hook-like teeth projecting through apertures in bars which define the cylindrical surface. These teeth in many prior structures terminate in round threaded shanks which extend through the apertures to receive individual nuts which secure the teeth to the bars. Such forged teeth are expensive to manufacture and difficult to regrind. The necessity of removing a separate nut from each tooth when the same require resharpening or replacement presents a costly maintenance problem.

The present invention overcomes the foregoing objections, first, by making the individual teeth of flat stock (such as heat treated high carbon, high chrome steel) which may be formed without forging or threading and readily hardened and ground and, secondly, by providing a novel method of securing the teeth to the picker bars which eliminates the necessity of using individual securing nuts.

It is an important object, therefore, of the present invention to provide an improved picker tooth made of flat stock and so shaped that it may be readily reground.

Another important object of this invention resides in the provision of a picker bar which is transversely slotted to receive a plurality of my improved picker teeth projecting in spaced relation therefrom and provided with a removable cooperating retaining means for firmly holding such picker teeth fixed in position relative to the bar.

A further important object of this invention consists in the provision of a picker tooth which is adapted for cooperation with the picker bar retaining means by a simple machining operation.

It is finally an important object of this invention to provide a picker bar and tooth assembly which is susceptible of economical manufacture and convenient assembly and disassembly.

Other and further important objects of this invention will be apparent from the specification and the accompanying drawings.

The invention (in a preferred form) is shown on the drawings and hereinafter more fully described.

On the drawings:

Fig. 1 is a fragmentary end elevation view of a picker cylinder equipped with the improved picker bar and picker teeth of this invention.

Fig. 2 is an exploded, perspective view showing the arrangement of the picker teeth, the picker bar and the means for retaining the picker teeth in association with the bar.

Fig. 3 is a side elevation of a picker tooth embodying the principles of this invention.

Fig. 4 is a rear edge elevation of a picker tooth embodying the principles of this invention; and Fig. 5 is an edge view of the lowered edge of the picker tooth ground in one manner made possible by this invention.

As shown on the drawings:

Reference numeral 10 in Fig. 1 represents a portion of a rotating picker cylinder. These cylinders are provided with longitudinal depressions 11 having shoulders at 12 arranged in spaced parallel relationship about the surface of the cylinder. In certain circumstances the cylinder consists of a series of spiders 10 held in fixed relationship on and rotatable with a shaft (not shown) to provide a skeleton-like cylinder which carries the picker bars and picker teeth.

The picker bars proper consist of elongated metal bars 13 which are secured to the cylinder or spiders 10 by stud bolts 14 extending through spaced apertures 15 formed in said bars. Each of the bars 13 is provided with a plurality of spaced lateral slots 16 which extend from the rear edge of the bar to a point approximately midway of its transverse dimension as shown in Fig. 2. Such slots 16 are adapted to receive my improved picker teeth, the construction of which will now be described.

These picker teeth are made of flat strip stock of a composition which may be readily hardened and ground. I have found chrome steel alloy admirable for such purpose. Each tooth consists of a shank portion 17 and a laterally extending hook-like tooth portion 18, the upper edge of which extends substantially at right angles to a centerline of the shank portion. Said hook portions 18 may be ground to a sharp flat edge or taper ground as shown at 19 in Figs. 4 and 5.

The rear edge of each of the picker teeth is provided with a notch 20 terminating in shoulders 20a and 20b, the notches and shoulders being provided for a purpose which will now be described.

By referring to Fig. 2 it will be noted that when the teeth are inserted in the slots 16, the rear edges thereof at the notches 20 are flush with the rear edge of the elongated bar 13, while portions of the teeth above and below the upper and lower surfaces of the bar 13 project rearwardly from the rear face of the bar at the shoulders 20a and 20b. Provision is thus made for the reception of an elongated retaining bar 21 between said shoulders and with its inner face in engagement with the rear edges of the teeth and also with the rear face of the elongated bar 13.

The retaining bar 21 is adapted to be secured firmly in fixed association with elongated bar 13 by stud bolts 22 extending through lateral apertures 23 provided at spaced intervals along the bar 13 and receiving nuts 24 which may be turned to draw the bar 21 into tight association with the bar 13 and the notches of the picker teeth which are mounted in the slots 16 in said bar with the rear edges either flush with or projecting slightly outwardly threfrom. It will further be apparent that by removal of the nuts 24 the bar 21 may be readily removed thus permitting of easy removal and insertion of the picker teeth for resharpening or replacement.

The picker teeth may be readily provided with the notches 20 after the teeth have been formed to desired shape by clamping a plurality thereof together and performing a simple milling or similar machining operation thereon in a manner familiar to those skilled in the art. The notches may also be formed during blanking of the teeth.

By arranging the hook portions 18 in right angle relationship with the shank of the picker tooth, it is possible to regrind the teeth extensively and at the same time maintain the same in the proper operative plane.

As previously noted, grinding of the forward portions of the hook portions 18 of the teeth may be effected in various ways dependent upon the cutting or picking surface desired.

It will be apparent from the foregoing description that this invention provides a picker bar and tooth assembly wherein the teeth have long wearing qualities, which is susceptible of economical manufacture and which readily may be assembled and disassembled for insertion and removal of the teeth associated therewith.

The retaining bars 21 not only hold the teeth firmly within the slots 16 in the bars 13 but the engagement of said retaining bars with the shoulders 20a and 20b on the teeth effectively prevents up-and-down movement of the teeth in reference to the bars 13.

I am aware that details of construction may be varied through a wide range without departing from the principles of this invention and I, therefore, do propose lim-

I claim:

1. A picker bar and tooth assembly comprising an elongated bar having a plurality of spaced transverse slots extending therethrough from an edge to a mid-portion thereof, a flat stock picker tooth in each of said slots, said teeth having edge portions projecting beyond the rear of the bar at the top and bottom thereof and an edge portion flush with the rear edge of the bar between said projecting portions, and a removable, smooth faced retaining bar held flush against the rear edge of the elongated bar between said projecting portions to hold the teeth tightly in the slots.

2. A picker bar and tooth assembly comprising an elongatd bar having a plurality of spaced transverse slots extending therethrough from an edge to a mid-portion thereof, a flat stock picker tooth in each of said slots and having edge portions projecting therefrom beyond the rear of the bar near the top and bottom thereof and an edge portion flush with the rear edge of the bar between said projecting portions, a straight edged, removable retaining bar engaging the rear edge of the bar between said projecting portions, and removable means for securing said retaining bar to said elongated bar and for drawing said retaining bar into tight engagement with the edges of said teeth between the projections.

3. A picker bar and tooth assembly comprising an elongated bar having a plurality of spaced transverse slots extending therethrough from an edge to a mid-portion thereof, a flat stock picker tooth extending edgewise into each of said slots and having portions projecting from the rear edge beyond the bar at the top and bottom thereof and an edge portion flush with the rear edge of the bar between said projecting portions, and a removable straight edged retaining bar having a width equal to the flush edge portions of said teeth, and means for holding said retaining bar flush with the rear edge of the elongated bar between said projecting portions to hold the teeth in the slot.

4. A picker bar and tooth assembly comprising an elongated bar having a plurality of spaced transverse slots extending therethrough from an edge to an intermediate portion thereof, a flat stock picker tooth extending edgewise into each of said slots and having portions projecting from the rear edge beyond the bar at the top and bottom thereof, a retaining edge between said portions and extending at least as far as the edge of said bar but not as far as said projecting portions, and a removable retaining bar secured to said picker bar and drawn tightly against said retaining edges of said teeth to tightly hold the teeth in said slots against vibration.

References Cited in the file of this patent

UNITED STATES PATENTS

| Number | Name | Date |
|---|---|---|
| 11,865 | Kitson | Oct. 31, 1854 |
| 113,825 | Weiler | Apr. 18, 1871 |
| 211,798 | Shaw | Jan. 28, 1879 |
| 752,576 | McClanahan | Feb. 16, 1904 |
| 815,395 | Williams | Mar. 20, 1906 |
| 836,030 | Hall | Nov. 13, 1906 |
| 1,672,704 | Allen et al. | June 5, 1928 |
| 2,148,547 | Fiese et al. | Feb. 28, 1939 |